(12) United States Patent
Gabbianelli et al.

(10) Patent No.: US 6,474,534 B2
(45) Date of Patent: Nov. 5, 2002

(54) HYDROFORMING A TUBULAR STRUCTURE OF VARYING DIAMETER FROM A TUBULAR BLANK MADE USING ELECTROMAGNETIC PULSE WELDING

(75) Inventors: Gianfranco Gabbianelli, Troy; Seetarama S. Kotagiri, Rochester Hills; Richard Ashley, Berkley, all of MI (US)

(73) Assignee: Magna International Inc., Aurora (CA)

( * ) Notice: Subject to any disclaimer, the term of this patent is extended or adjusted under 35 U.S.C. 154(b) by 0 days.

(21) Appl. No.: 09/841,176

(22) Filed: Apr. 25, 2001

(65) Prior Publication Data

US 2002/0003159 A1 Jan. 10, 2002

Related U.S. Application Data

(60) Provisional application No. 60/199,817, filed on Apr. 26, 2000.

(51) Int. Cl.[7] ............... B21D 39/04; B23K 20/08; B23K 11/00; B23P 19/00
(52) U.S. Cl. ............... 228/131; 228/107; 228/126; 219/117.1; 29/421.1
(58) Field of Search ............... 228/107, 126, 228/131; 219/117.1; 29/423.1

(56) References Cited

U.S. PATENT DOCUMENTS

| | | | |
|---|---|---|---|
| 3,108,325 A | 10/1963 | Harvey et al. | |
| 3,810,372 A | 5/1974 | Queyroix | |
| 4,504,714 A | 3/1985 | Katzenstein | |
| 4,513,188 A | 4/1985 | Katzenstein | |
| 4,751,836 A | 6/1988 | Breese | |
| 5,170,557 A | * 12/1992 | Rigsby | 138/148 |
| 5,333,775 A | 8/1994 | Bruggemann et al. | |
| 5,419,171 A | 5/1995 | Bumgarner | |
| 5,445,001 A | 8/1995 | Snavely | |
| 5,813,264 A | 9/1998 | Steingroever | |
| 5,815,901 A | 10/1998 | Mason et al. | |
| 5,824,998 A | 10/1998 | Livshiz et al. | |
| 5,826,320 A | 10/1998 | Rathke et al. | |
| 5,966,813 A | 10/1999 | Durand | |
| 5,981,921 A | 11/1999 | Yablochnikov | |
| 5,983,478 A | 11/1999 | Dolan et al. | |
| 5,983,497 A | 11/1999 | Breese et al. | |
| 5,987,950 A | 11/1999 | Horton | |
| 6,010,155 A | 1/2000 | Rinehart | |
| 6,047,582 A | 4/2000 | Daehn | |
| 6,050,120 A | 4/2000 | Daehn et al. | |
| 6,104,012 A | 8/2000 | Durand | |
| 6,254,488 B1 | * 7/2001 | Hill | 464/180 |
| 6,255,631 B1 | * 7/2001 | Kichline et al. | 219/617 |
| 6,346,684 B1 | * 2/2002 | Gabbianelli et al. | 219/117.1 |
| 6,361,244 B1 | * 3/2002 | Ni et al. | 403/645 |

FOREIGN PATENT DOCUMENTS

| | | |
|---|---|---|
| DE | 1 804 455 | 9/1970 |
| GB | 2 330 096 A | 4/1999 |
| WO | WO 97/00595 | 1/1997 |
| WO | WO 99/65636 | 12/1999 |

* cited by examiner

Primary Examiner—M. Alexandra Elve
Assistant Examiner—Zidia Pittman
(74) Attorney, Agent, or Firm—Pillsbury Winthrop LLP

(57) ABSTRACT

A method of hydroforming a tubular structure of varying diameter along its longitudinal axis, comprising the formation of a tubular blank member by welding together, at their periphery, tubes of different diameters using electromagnetic pulse welding.

19 Claims, 4 Drawing Sheets

HYDROFORMING A TUBULAR STRUCTURE OF VARYING DIAMETER FROM A TUBULAR BLANK MADE USING ELECTROMAGNETIC PULSE WELDING

This application claims the benefit of U.S. Provisional Patent Application Serial No. 60/199,817 filed on Apr. 26, 2000, the contents of which are incorporated herein by reference.

FIELD OF INVENTION

The present invention generally relates to the forming of tubular structural members by internal pressurization of the member, and more particularly to such method as applied to a tubular structural member with a varying diameter.

BACKGROUND OF THE INVENTION

Hydroforming methods are commonly known as a means for shaping a tubular metal blank having a circular cross section into a tubular component having a predetermined desired configuration. A typical hydroforming operation involves the placement of a tubular metal blank having a circular, uniform cross section into a die cavity of a hydroforming assembly and providing high pressure fluid to the interior of the blank to cause the blank to expand outwardly into conformity with the surfaces defining the die cavity. Typically, the opposite longitudinal ends of the tubular metal blank are sealed by hydraulic rams, and high pressure hydroforming fluid is provided through a port formed in at least one of the rams to expand the tubular blank.

The cross-sectional shape of the resultant structural member is typically appreciably different from the cross-sectional shape of the tube blank. For example, box shaped or quadrilateral cross sections are commonly formed from the cylindrical tube blanks.

In relatively low-pressure hydroforming, the forming is essentially limited to pressurizing the tube blank to force it to conform to an enclosing die, and produces little change in the length of a part. The length of the formed part is essentially equal to the length of the tube blank. There is generally a tradeoff made between section perimeter and the local wall thickness. Hydroforming will generally increase perimeter and decrease wall thickness.

It is appreciated that a variant form of low-pressure hydroforming utilizes extremely high pressure and produces parts shorter than the tube blank to provide an increase in perimeter with little or no associated decrease in wall thickness. This requires a longitudinal loading of the blank simultaneous with the pressurization of the blank.

It is often highly desirable to produce parts having wall perimeters that vary locally along the length of the formed part by more than the amount available with convention hydroforming, such as a tubular member with variations of greater than 100% in diameter or perimeter with respect to the smallest diameter or perimeter with respect to the smallest diameter or perimeter of the member. Unfortunately, hydroforming of a conventional tube blank does not readily lend itself to providing a part with such localized variations due to excessive thinning of the wall thickness at the areas of greatest required expansion.

One approach to hydroforming parts that satisfy longitudinally varying thickness and perimeter requirements is to form a tailored tube blank that has a non-uniform perimeter and/or thickness adapted to the structural member to be hydroformed, as disclosed in U.S. Pat. No. 5,333,775. Here, tube blanks having different wall thicknesses and/or perimeters are welded together by conventional means to form a compound tube blank.

In this patent, two tube blanks of varying diameter are joined by first forming a transition region between them so that the two adjacent ends meet. These transition regions consist of either a tapered or a flared end being formed on the end of either or both blanks, which is formed using conventional tube forming means, such as with tube expanders. Alternatively, an entirely separate piece of tubing with a truncated conical shape can be used as a transition blank member between two blanks of different diameters. In this case, the diameter of each end of the transition member corresponds to the tube blank end that it interfaces with. In either case, conventional welding is used to join the blanks in end-to-end abutting relation. The resultant tube blank is then hydroformed. The die into which the blank is placed has a generally corresponding transition perimeter to that of the tube blank so that the expansion of the perimeter is limited to approximately five percent in any one location along a longitudinal axis of the blank.

The method described in U.S. Pat. No. 5,333,775 requires the inconvenient steps of first tapering or flaring the blank ends using tube expanders, or inserting a separate, conical shaped tube blank between two blanks with different diameters to form a transition region connecting them, and then tediously welding the ends together in end-to-end fashion. In addition, while an end-to-end weld may be satisfactory for certain applications, it may not be optimal for more demanding hydroforming requirements.

SUMMARY OF THE INVENTION

It is an object of the present invention, therefore, to overcome the problems associated with the prior art noted above. In achieving this object, the present invention provides a method of hydroforming a tubular part which comprises providing a first tubular member having a first diameter, providing a second tubular member having a second diameter which is greater than the first diameter of the first tubular member, positioning the first and second tubular members so that a first portion of the first tubular member is telescopically disposed within a second portion of the second tubular member so that the first and second portions are disposed in axially overlapping relation with one another, applying an electromagnetic pulse of sufficient magnitude in a vicinity of the overlapping portions to rapidly force the first and second portions into peripheral welded engagement with one another so as to form a welded tubular structure, placing the welded tubular structure into a hydroforming die assembly, and providing fluid pressure to the interior thereof so that it expands outwardly into conformity with the die surfaces of the hydroforming die assembly.

The electromagnet pulse can be applied either from the exterior of the tubular assembly; in which case the second outer tubular member is forced to move inwardly and into welded contact with the first tubular member, or the electromagnetic pulse can be applied from the interior of the tubular assembly, in which case the first inner tubular member is forced to move outwardly and into welded contact with the second tubular member. Alternatively, each of the first and second members can be moved towards the other.

DETAILED DESCRIPTION OF THE DRAWINGS

Figure 1:
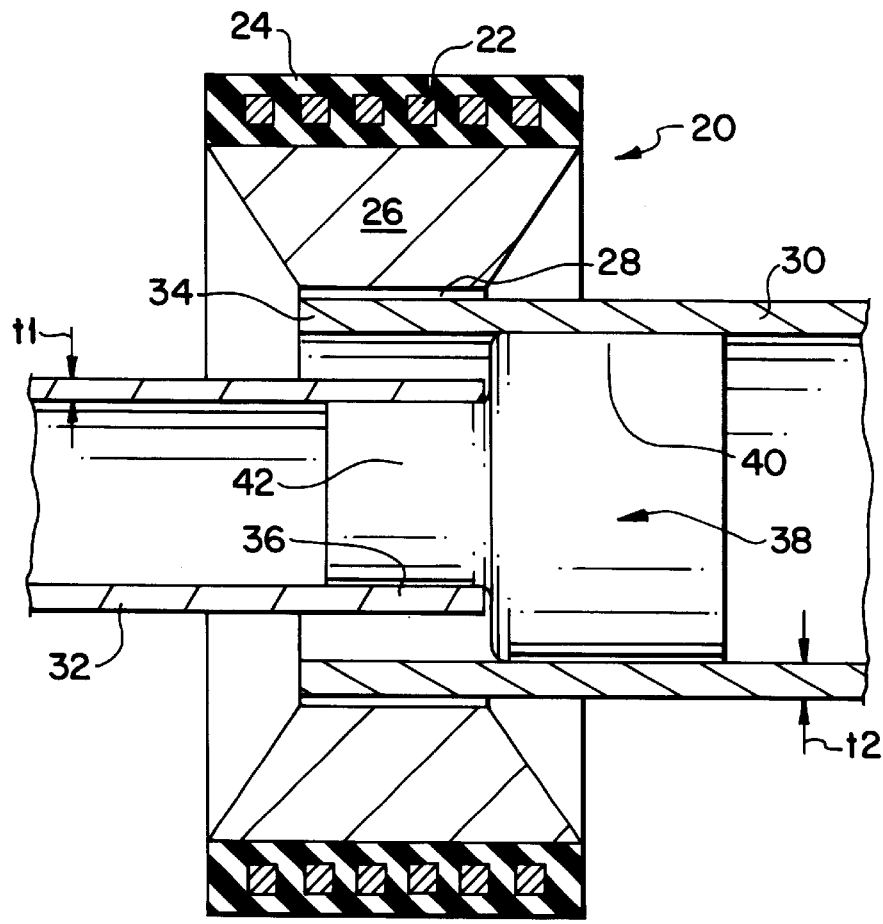
FIG. 1 is a longitudinal cross-section view of one embodiment of the present invention, where two tubular blanks of different diameters are to be electromagnetically welded by the welding device placed on the outside of the tube blank with the larger diameter.

Electromagnetic pulse welding was developed from a technique in which a metal workpiece is formed using a magnetic pulse, known as pulsed magnetic forming (PMF). PMF is a process in which a metal workpiece or a portion thereof is put into a rapid motion by a pulsed magnetic field which causes the workpiece to deform. One advantage of the PMF process is in that the specific heat in this process is minimal and consequently there is no or very little heating of the workpiece.

The PMF process uses a bank capacitor, a forming coil and often a field shaper for creating an intense magnetic field. The very intense magnetic field required for the PMF process is created by a rapid discharge of electric energy, stored in the bank capacitor, into the forming coil. The resulting eddy currents that are induced in the workpiece yield magnetic repulsion between the workpiece and the forming coil, and since the forming coil is firmly supported in its position, the repulsion causes the workpiece to deform.

As the workpiece surface moves under the influence of the repulsion force, it absorbs energy from the magnetic field. In order to apply most of the available energy to forming and reduce energy losses due to permeation of energy into the workpiece material (which causes energy waste by resistance heating), the forming magnetic pulse is made to be very short. In most PMF applications, the pulses have a duration between about 10 to about 250 mu.sec. (duration of the first wave of the discharging current).

U.S. Pat. No. 5,824,998, hereby incorporated by reference, discloses the method of using PMF to join or weld two or more workpieces together. Electromagnetic pulse welding (EPW) is achieved by causing a surface of a first of the two workpieces to move rapidly towards a surface of the other workpiece by means of a pulsed magnetic force, and controlling the conditions such that after the respective surface of the first workpiece impacts with the respective surface of the second workpiece, the two surfaces become joined or welded to one another. The magnetic energy may be controlled such that the speed of the moving workpiece imparts a kinetic energy to this workpiece, prior to impact with the second workpiece, which is larger than the sum of the plastic deformation energy of the first, moving workpiece and of the elastic deformation energy of the second, still workpiece, after the impact.

With electromagnetic pulse welding, the end portion of a larger blank is contracted and brought into contact with the outside diameter of a smaller blank by plastically deforming the end portion of the larger blank. Or conversely, the end portion of a smaller blank is expanded and brought into contact with the inside diameter of a larger blank by plastically deforming the end portion of the smaller blank. Upon impact, welding of the two surfaces occurs. The plastic deformation is caused by the force imparted to the blank end by the electromagnet, which occurs as part of the electromagnetic welding process. Therefore, electromagetic pulse welding eliminates the need to taper or flare the ends of the tube blanks using conventional tube expanders, or to provide a conical shape tube blank between two blanks with different diameters, to form a transition region connecting them.

Referring now to the FIGS, depicted in FIG. 1 (in longitudinal cross-section) is an assembly of two tubular blanks, with different diameters, disposed in a manner to be electromagnetically welded together. In the embodiment shown, tubular blank 30 has a diameter larger than tubular blank 32. The wall thicknesses of blank 30 and 32, t2 and t1, respectively, may differ as well. As shown, blank 32 is telescopically disposed within blank 30, creating overlapping portion 36 on blank 32 and overlapping portion 34 on blank 30, which are to be welded to one another.

The electromagnetic pulse device, generally designated as 20, comprises a forming coil 22 consisting of a plurality of windings, separated from one another by an insulating material 24. The device also may comprise a field shaper 26 to direct the field to the welding region 34 and 36. As a result of application of the pulsed electromagnetic force, a strong magnetic pressure will result in the lumen 28 of the field shaper and, as a result, the cylindrical end 34 of blank 30 within the lumen will be rapidly and constricted, via plastic deformation, and forced into welded engagement upon impact with overlapping portion 36.

An insert 38 is provided which has a first portion 40 having a diameter equal to the internal diameter of tubular blank 30, and has a second portion 42 which has a diameter equal to the internal diameter of tubular blank 32. The insert 38 has several functions: one of which is to ensure proper mutual placing of the two tubular blanks; another being to ensure that upon application of a pulsed magnetic force, only portion 34 of tubular blank 30 will move and constrict; and a further being to support portion 36 to ensure that welding between the two portions will occur.

The insert 38 should be made from a suitable material that will not itself be welded to the tubular portion 36 when impacted by tubular portion 34. A suitable material for insert 38 is, therefore, wood, hard plastic, thermoset plastic, ceramic, or a sufficiently hard metal (preferably steel) having a high enough yielding point above tubular blanks 30, 32 such that the insert 38 will not significantly yield upon impact of tubular portion 34.

Support of the internal walls of a tubular blank during impact by an external tubular blank may also be achieved by a variety of other means. These include, for example, filling the entire cylinder with a non-compressible liquid such as water; introducing into the tube a magnetic liquid such as mercury, oil with suspended metal particles, etc., and then applying a constant magnetic field prior to the PMF so as to concentrate the magnetic liquid at a portion where the support is required; by means of ice frozen at a respective portion; etc. Such solutions of support are required, for example, where the internal cylinder is long and it is thus not possible to introduce an insert such as that shown in FIG. 1.

Figure 2:
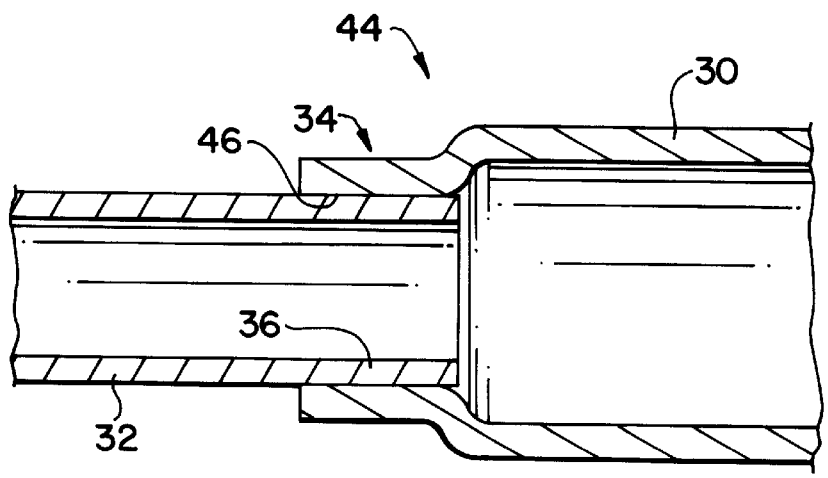
FIG. 2 is a longitudinal cross-section view of a compound tube blank formed by the assembly shown in FIG. 1.

The resultant blank 44, produced from the assembly of FIG. 1, is shown in FIG. 2. Here, weld 46 was produced by electromagnetic pulse welding to join blank 32 and 30. It will be understood to those skilled in the art that the above procedure can be repeated from either end of blank 44 to attach a third blank. The procedure can then be performed again on either end of this three piece blank to attach a fourth blank, and so on. The resultant tubular blank can then be placed in a die for hydroforming, as will be described shortly.

Figure 3:
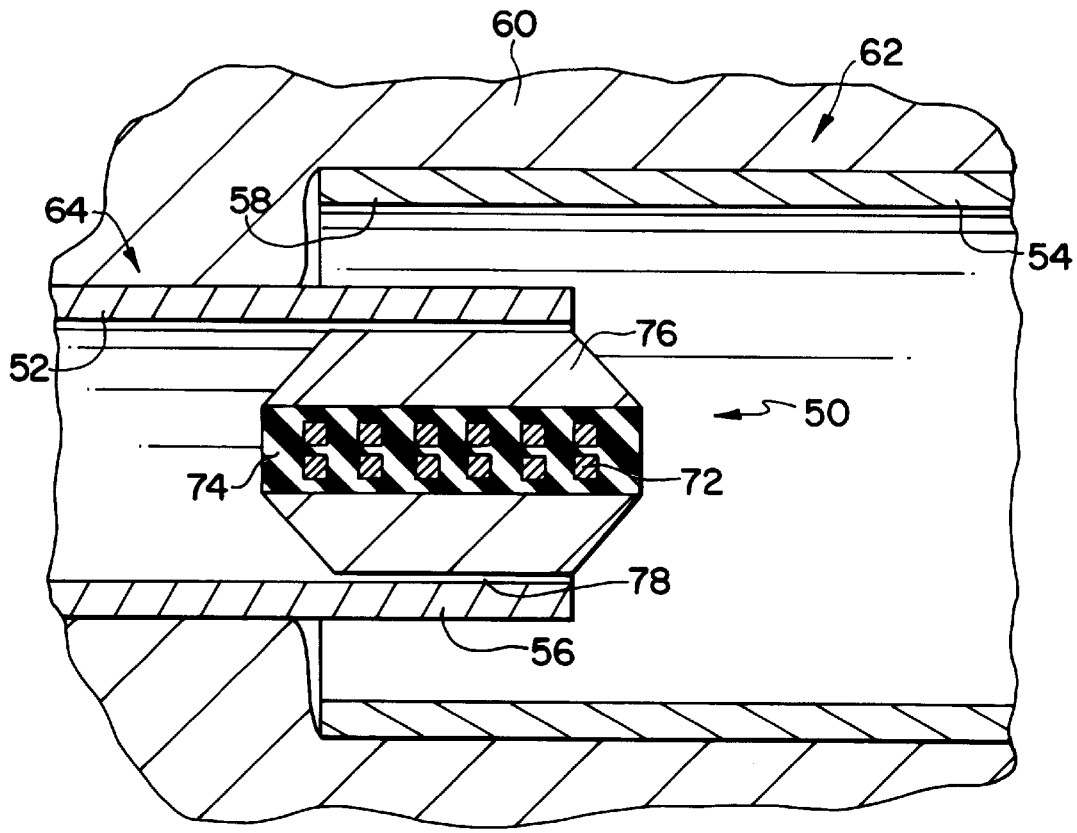
FIG. 3 is a longitudinal cross-section view of another embodiment of the present invention, where two tubular blanks of different diameters are to be electromagnetically welded by the welding device placed on the inside of the tube blank with the smaller diameter.

Another embodiment of the present invention is shown in FIG. 3. Here, tubular blank 52 is telescopically disposed within tubular blank 54, creating overlapped regions 56 and 58, respectively, that are to be electromagnetically welded together. The electromagnetic pulse device 50 is placed on the inside of tubular blank 52, rather than on the outside of the larger diameter blank as in FIG. 1. This way, during the application of the pulsed electromagnetic force, portion 56 moves rapidly outward towards portion 58 and upon impact welds therewith.

As shown in FIG. 3, insert 60 is placed on the outside of blank 54. Blank 60 contains a region 62 that has a diameter equal to the outside diameter of tubular blank 54, and a region 64 equal to the outside diameter of tubular blank 52. The purpose of insert 60 is the same as that described in the embodiment of FIG. 1. The electromagnetic pulse device, as in FIG. 1, comprises a forming coil 72 consisting of a plurality of windings, separated from one another by an insulating material 74. The device also may comprise a field shaper 76 to direct the field to the welding region 56 and 58. As a result of application of the pulsed electromagnetic force, a strong magnetic pressure will result in the lumen 78 of the field shaper and as a result, the cylindrical end 56 of blank 52 within the lumen will be rapidly expanded, via plastic deformation, and forced into welded engagement upon impact with overlapping portion 58.

Figure 4:
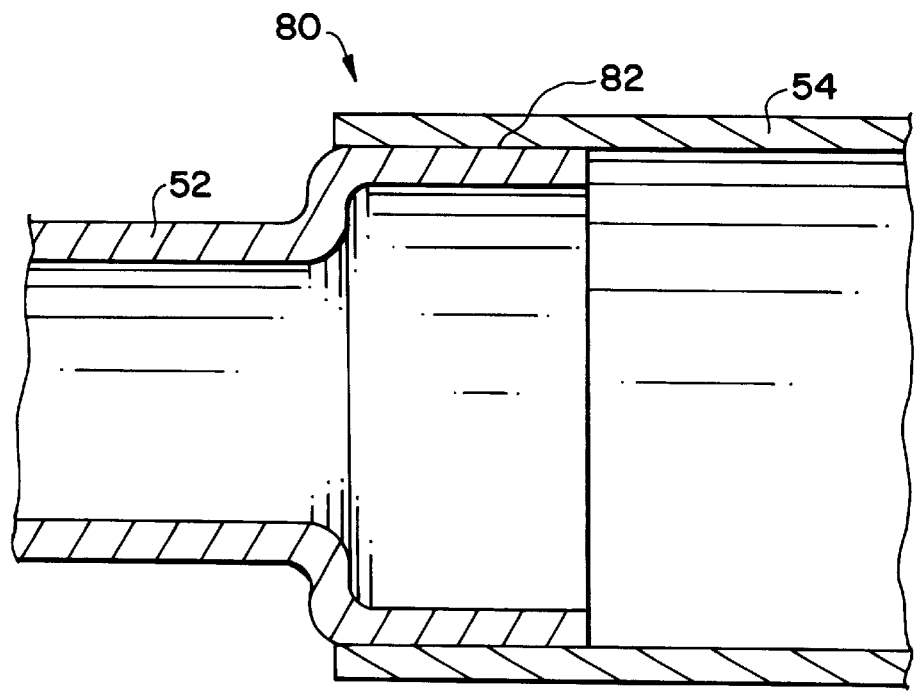
FIG. 4 is a longitudinal cross-section view of a compound tube blank formed by the assembly shown in FIG. 3.

The resultant tubular blank 80, produced from the assembly of FIG. 3, is shown in FIG. 4. Here, weld 82 was produced by electromagnetic pulse welding to join blank 54 and 52. It will be understood to those skilled in the art that the above procedure, as in the embodiment of FIG. 2, can be repeated from either end of blank 80 to attach a third blank, and a fourth blank, etc.

Figure 5:
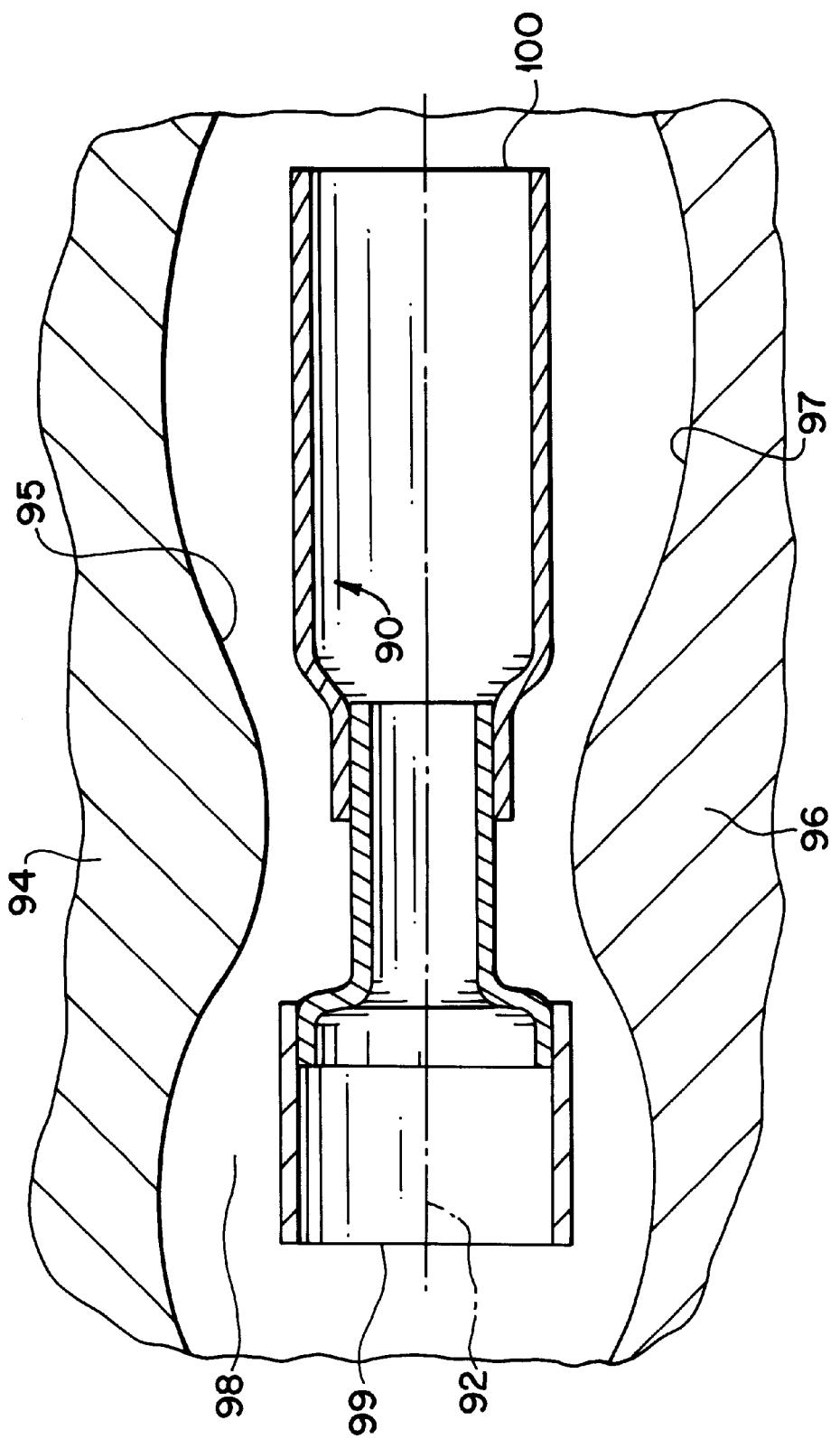
FIG. 5 is a longitudinal cross-section view of a compound tubular blank member formed from a combination of the electromagnetic welding operations of FIGS. 1 and 3, and a schematic depiction of the hydroforming die cavity into which the tubular blank member is placed.

It will also be appreciated by those skilled in the art that the resultant blank may consist of a combination of the two embodiments shown in FIGS. 2 and 4. That is, two blanks may be joined by the embodiment of FIG. 1, where the outside portion of the blank with a larger diameter is forced inward. This resultant blank can then be joined to a third tubular blank using the embodiment of FIG. 3, where the inside portion of the blank with smaller diameter is forced outward. This resultant blank can then be joined to a fourth blank, by either embodiment, and so on. Such a tubular blank combination 90 is depicted in FIG. 5.

In accordance with the present invention, a tube blank manufactured in accordance with FIG. 1, or FIG. 3, or some combination thereof (e.g., see combination blank 90 in FIG. 5) is then hydroformed. For example, as shown in FIG. 5, the tube blank 90 is placed in a die 94 for hydroforming. As can be appreciated from FIG. 5, the compound tube blank 90 has been tailored so that its outer configuration corresponds more closely to the shape of the die cavity 98 of the die 94 in comparison with a conventional uniform cross-sectioned blank. For example, the larger volume portions (and cross-sectional areas) of the die cavity 98 are generally aligned with the larger diameter portions of the compound blank, and the smaller portions of the die cavity 98 are generally aligned with the narrower portions of the compound blank.

The invention will be described further with regard to the combination blank 90, although it should be understood that any blank formed in accordance with the above disclosure can be used. As shown, the blank 90 is positioned in a hydroforming machine between a first die section 94 and a cooperating die section 96. These cooperating die sections, 94, 96 have respective die surfaces 95, 97 that, when moved together, define the longitudinal die cavity 98. The open ends 99, 100 of the tubular blank 90 are engaged and sealed by conventional hydroforming rams. The cooperating die sections 94, 96 are pressed together to enclose the blank 90 in the die cavity 98, and the blank is filled with hydroforming fluid.

Figure 6:
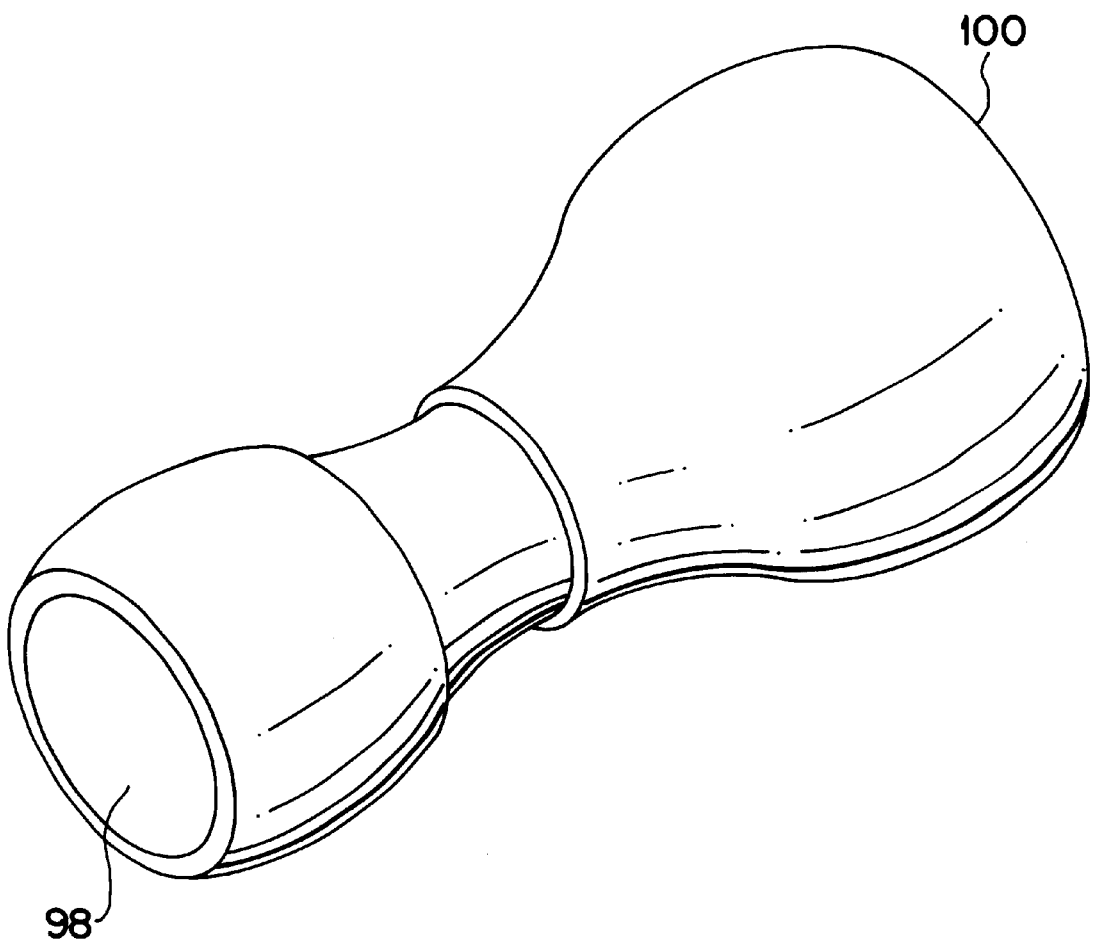
FIG. 6 shows the hydroformed structural member of the tubular blank of FIG. 5.

The pressure of the hydraulic fluid inside the tube blank 90 is increased to a sufficient level to force blank 90 to expand into conformity with the surfaces 95, 97 defining the die cavity 98. During the action, the rams engaging the opposite ends 99, 100 of tube 90 are forced inwardly towards one another to maintain the wall thickness of tube 90 with a predetermined range (about ±10% of the original blank). As a result, a desired tubular structural member 105, as shown in FIG. 6, is formed. The structural member is then depressurized and drained of hydroforming fluid. The die sections 94, 96 are separated, permitting the formed tubular structural member to be removed from the die 98. Hydroforming equipment suitable for use in this operation is described in U.S. Pat. No. 5,987,950, which is assigned to the assignee of the present invention.

It should be appreciated by those skilled in the art that the present invention contemplates that two tubular blanks that are electromagnetically pulse welded together may have different wall thicknesses as well as differing diameters. Also, the inside diameter of the larger tube blank may be only slightly smaller than the outside diameter of the smaller tube blank; therefore, the radial space between blanks 30 and 32 at portions 34 and 36 of FIG. 1, or between blanks 54 and 52 at portions 58 and 56 of FIG. 3, may be negligible.

It is further appreciated that the die surfaces 95 and 97 defining die cavity 98 depicted in FIG. 5 can be of cross-sectional shapes other than circular, such as oval, rectangular, triangular, etc., depending on the desired shape of the part to be formed. For example for many automotive frame applications, tubular parts having a quadrilateral or triangular cross-section is desired.

It should further be appreciated that the foregoing detailed description and accompanying drawings of the preferred embodiment are merely illustrative in nature, and that the present invention includes all other embodiments that are within the scope of the described embodiment and appended claims.

What is claimed:

1. A method of hydroforming a tubular part comprising:
providing a first tubular member having a first diameter;
providing a second tubular member having a second diameter which is greater than the first diameter of said first tubular member;
effecting relative movement between said first tubular member and said second tubular member so that a first portion of said first tubular member is telescopically disposed within a second portion of said second tubular member and so that said first and second portions are disposed in axially overlapping relation with one another;
applying an electromagnetic pulse of sufficient magnitude in a vicinity of said overlapping first and second portion of said first and second members to rapidly force said first and second portions into peripheral welded engagement with one another, so as to form a welded tubular structure;

placing said welded tubular structure into a hydroforming die assembly; and hydroforming said welded tubular structure so as to expand said welded tubular structure outwardly into conformity with die surfaces of said hydroforming die assembly.

2. A method according to claim 1, wherein said electromagnetic pulse is applied from a region external to said second tubular member so as to force said second portion of said second tubular member inwardly toward the axes of said first and said second tubular members and into welded engagement with said first portion of said first tubular member.

3. A method according to claim 1, wherein said electromagnetic pulse is applied from a region internal to said first tubular member so as to force said first portion of said first tubular member outwardly away from axes of said first and said second tubular members and into welded engagement with said second tubular member.

4. A method according to claim 1, further comprising bending of said welded tubular structure prior to providing fluid pressure therein.

5. A method according to claim 2, wherein an internal die structure is positioned within said first tubular member at said overlapping first and second portions so as to provide internal support to said first portion of said first tubular member when said second portion of said second tubular member is forced into welded engagement with said first portion.

6. A method according to claim 3, wherein an external die structure is positioned externally to said second tubular member at said overlapping first and second portions so as to provide external support to said second portion of said second tubular member when said first portion is forced into welded engagement with said second portion.

7. A method according to claim 1, wherein the first tubular member is provided with a wall thickness t1 and the second tubular member is provided with a wall thickness t2, where said t1 is not equal to said t2.

8. A method according to claim 7, wherein said t2 equals said t1.

9. A method according to claim 5, wherein said internal die structure is provided with a first section having a diameter equal to the diameter of said first portion of said first tubular member, and a second section having a diameter equal to the inside diameter of said second tubular member so that when the electromagnetic pulse force is applied, internal support is provided to the second tubular member adjacent the second portion.

10. A method according to claim 6, wherein said external die structure is provided with a first portion equal to the outside diameter of said second tubular member, and a second portion having a diameter equal to the outside diameter of said first tubular member, so that when the electromagnetic pulse is applied, external support is provided to the first tubular member adjacent the first portion.

11. A method according to claim 9, wherein the internal die structure is provided from a material that will not weld to the tubular member of which it makes contact.

12. A method according to claim 10, wherein the external die structure is provided from a material that will not weld to the tubular member of which it makes contact.

13. A method according to claim 11, wherein the internal die structure is provided from a material made of wood, thermoset plastic, ceramic, or a high strength steel with a yield strength greater than that of said first and said second tubular members.

14. A method according to claim 12, wherein the external die structure is provided from a material made of wood, thermoset plastic, ceramic, or a high strength steel with a yield strength greater than that of said first and said second tubular members.

15. A method of hydroforming a tubular part comprising:

providing a first tubular member having a first diameter, the end of said first tubular member having an end face;

providing a second tubular member having a second diameter which is approximately equal to the first diameter of said first tubular member, the end of said second tubular member having an end face;

providing a beveled surface on the end face of said first tubular member, said beveled surface at an obtuse angle with respect to the longitudinal axis of the first tubular member;

providing a beveled surface on the end face of said second tubular member mutually opposite of said beveled surface on said end face of said first tubular member;

bringing the beveled ends of said first and said second tubular members together in contact with one another, defining a contact region;

applying an electromagnetic pulse of sufficient magnitude in a vicinity of said contact region to rapidly force said beveled surfaces of said first and said second tubular members into welded engagement with one another, so as to form a welded tubular structure;

placing said welded tubular structure into a hydroforming die assembly; and hydroforming said welded tubular structure so as to expand said welded tubular structure outwardly into conformity with die surfaces of said hydroforming die assembly.

16. A method according to claim 15, wherein said electromagnetic pulse is applied from a region external to said second tubular member so as to force said beveled surface on said second tubular member inwardly toward the beveled surface of said first tubular member and into welded engagement therewith.

17. A method according to claim 15, wherein said electromagnetic pulse is applied from a region internal to said first tubular member so as to force said beveled surface of said first tubular member outwardly toward the beveled surface of said second tubular members and into welded engagement therewith.

18. A method according to claim 16, wherein an internal die structure is positioned within said first tubular member at said contact region so as to provide internal support to said first tubular member when said beveled surface of said second tubular member is forced into welded engagement with said beveled surface of said first tubular member.

19. A method according to claim 16, wherein an external die structure is positioned externally to said contact region so as to provide external support to said second tubular member when said beveled surface of said first tubular member is forced into welded engagement with said beveled surface of said second tubular member.

* * * * *